Patented June 27, 1950

2,512,960

UNITED STATES PATENT OFFICE 2,512,960

NEW CELLULOSE DERIVATIVES

Paul W. Morgan, Kenmore, N. Y., assignor to E. I. du Pont de Nemours & Company, Wilmington, Del., a corporation of Delaware No Drawing. Application September 16, 1947, Serial No. 774,443

4 Claims. (Cl. 260—226)

This invention relates to new chemical compounds. More particularly, it relates to new cellulosic derivatives.

An object of this invention is to provide new cellulose derivatives.

Another object of this invention is to provide hydroxyethyl cellulose acetate chloroacetate.

Other and additional objects will become apparent hereinafter.

The objects of this invention are accomplished, in general, by acetylating hydroxyethyl cellulose chloroacetate or by chloroacetylating hydroxyethyl cellulose acetate.

The acetylation of hydroxyethyl cellulose chloroacetate can be carried out either in a homogeneous or heterogeneous system. The chloroacetylation of hydroxyethyl cellulose acetate can also be carried out either in a homogeneous or heterogeneous system.

The details and manner of practicing the invention will become apparent by reference to the following specific examples, it being understood that these examples are merely illustrative embodiments of the invention and that the scope of the invention is not to be limited thereto. Throughout the examples, the proportions of the ingredients are parts by weight.

Example 1

Hydroxyethyl cellulose chloroacetate containing 0.60 chloroacetyl groups per glucose unit was prepared by chloroacetylating hydroxyethyl cellulose (containing 0.33 mol hydroxyethyl groups per glucose unit and dried by solvent exchange through acetic acid) for 18 hours at 80° C. in a chloroacetylating bath consisting of 11 parts anhydrous benzene and 5 parts of anhydrous monochloroacetic acid, the proportions being per part of the cellulose. At the end of the reaction, the hydroxyethyl cellulose chloroacetate was filtered from the benzene liquors, washed once with benzene and once with acetic acid. The resulting damp fiber was acetylated in an acetylating bath consisting of 4.6 parts glacial acetic acid, 2.7 parts acetic anhydride, and 0.03 part sulfuric acid (S. G. 1.84), the proportions being per part of the hydroxyethyl cellulose, according to the following procedure.

| Time | Temperature | Reagents | Quantities | Remarks |
|---|---|---|---|---|
| | °C | | Parts | |
| 0 | 20 | Glacial CH₃COOH | 4.0 | |
| | | Fiber | ca. 1.26 | |
| | | Acetic anhydride | 2.16 | |
| 0:05 | 20 | Conc. H₂SO₄ | 0.012 | Added as mixture. |
| | | Glacial CH₃COOH | 0.3 | |
| 0:15 | 20 | Conc. H₂SO₄ | 0.018 | Do. |
| | | Glacial CH₃COOH | 0.3 | |
| | | Acetic anhydride | 0.54 | |
| 0:30 | 25 | | | Raised jacket temp. 5° C. every 10 min. |
| 1:30 | 45–50 | 50% CH₃COOH | 5.0 | Nearly fiber free. |

The hydroxyethyl cellulose acetate chloroacetate gum was filtered through a cone of 30-mesh screen. After diluting with 5 parts of acetone, it was precipitated in hard water at 50°–60° C. with rapid stirring. The white fibrous cake was soaked for 4 days in 12 charges of hard water, pressed free of excess water, and air-dried. The drying was completed in a circulating air oven at 100° C.

The primary esterification product prepared by this procedure contained 2.29 acetyl groups and 0.60 chloroacetyl groups per glucose unit. It was quite heat-stable and had good acetone-solubility, as well as solubility in dioxane chloroform, ethylene dichloride, mixtures of such chlorinated solvents with alcohol, and other solvents for cellulose acetate.

Example 2

Same as Example 1, except that after the esterification step the hydroxyethyl cellulose chloroacetate was hydrolyzed for 5 hours at 50° C. with a solution consisting of 4 parts glacial acetic acid, 1.60 parts water, and 0.30 part sulfuric acid (S. G. 1.84), the proportions being per part of hydroxyethyl cellulose.

The product contained 2.16 acetyl and 0.53 chloroacetyl groups per glucose unit, and showed better heat-stability and slight improved acetone-solubility than the product obtained in Example 1.

Example 3

Hydroxyethyl cellulose chloroacetate containing 0.33 chloroacetyl groups per glucose unit was prepared by chloroacetylating hydroxyethyl cellulose (containing 0.28 mol hydroxyethyl groups per glucose unit and dried by solvent exchange through acetic acid) for 18 hours at 80° C. in a chloroacetylating bath consisting of 70 parts anhydrous benzene and 6 parts of anhydrous monochloracetic acid, the proportions being per part of the cellulose. At the end of the reaction, the hydroxyethyl cellulose chloroacetate was filtered from the benzene liquors, washed once with benzene and once with acetic acid. The resulting damp fiber was acetylated in an acetylating bath consisting of 8.4 parts glacial acetic acid, 5.4 parts acetic anhydride, and 0.01 part of sulfuric acid (S. G. 1.84), the proportions being per part of hydroxyethyl cellulose, according to the following procedure:

| Time | Temperature | Reagents | Quantities | Remarks |
|---|---|---|---|---|
| | °C | | Parts | |
| 0 | 20 | Glacial CH₃COOH | 6.0 | |
| | | Fiber | ca.1.14 | |
| | | Acetic anhydride | 4.2 | |
| 0:05 | 20 | Conc. H₂SO₄ | 0.004 | Added as mixture. |
| | | Glacial CH₃COOH | 1.2 | |
| 0:15 | 20 | Conc. H₂SO₄ | 0.006 | Do. |
| | | Glacial CH₃COOH | 1.2 | |
| | | Acetic anhydride | 1.2 | |
| 0:30 | 25 | | | Raised jacket temp. 5° C. every 10 min. |
| 1:30 | 45–50 | 50% CH₃COOH | 6.0 | Nearly fiber free. |

The hydroxyethyl cellulose acetic chloroacetate gum was filtered through a cone of 30-mesh screen diluted with 6 parts of acetone and precipitated in hard water at 50°–60° C. with rapid stirring. The white fibrous cake was soaked for 4 days in 12 charges of hard water, pressed free of excess water, and air-dried. The drying was completed in a circulating air oven at 100° C.

The product contained 2.60 acetyl groups and 0.33 chloroacetyl groups per glucose unit, and its solubility was the same as that of Example 1.

Example 4

Hydroxyethyl cellulose chloroacetate containing 0.51 chloroacetyl groups per glucose unit was prepared by chloroacetylating hydroxyethyl cellulose (containing 0.28 mol hydroxyethyl groups per glucose unit and dried by solvent exchange through acetic acid) for 5 hours at 80° C. in a chloroacetylating bath consisting of 22 parts anhydrous benzene and 4 parts of monochloroacetic anhydride, the proportions being based on the cellulose. At the end of the reaction, the hydroxyethyl cellulose chloroacetate was filtered from the benzene liquors, washed once with benzene and once with acetic acid. The resulting damp fiber was acetylated in an acetylating bath consisting of 8.4 parts acetic acid, 2.7 parts acetic anhydride, and 0.04 part sulfuric acid (S. G. 1.84), the proportions being based on the hydroxyethyl cellulose, according to the following procedure:

| Time | Temperature | Reagents | Quantities | Remarks |
|---|---|---|---|---|
| | °C | | Parts | |
| 0 | 20 | Glacial CH₃COOH | 6.0 | |
| | | Fiber | ca.1.22 | |
| | | Acetic anhydride | 2.1 | |
| 0:05 | 20 | Conc. H₂SO₄ | 0.016 | Added as mixture. |
| | | Glacial CH₃COOH | 1.2 | |
| 0:15 | 20 | Conc. H₂SO₄ | 0.024 | Do. |
| | | Glacial CH₃COOH | 1.2 | |
| | | Acetic anhydride | 0.6 | |
| 0:30 | 25 | | | Raised jacket temp. 5° C. every 10 min. |
| 1:30 | 45–50 | 50% CH₃COOH | 6.0 | Nearly fiber free. |

The hydroxyethyl cellulose acetic chloroacetate gum was filtered through a cone of 30-mesh screen diluted with 6 parts of acetone and precipitated in hard water at 50°–60° C. with rapid stirring. The white fibrous cake was soaked for 4 days in 12 charges of hard water, pressed free of excess water, and air-dried. The drying was completed in a circulating air oven at 100° C.

The esterification product contained 2.26 acetyl groups and 0.51 chloroacetyl groups per glucose unit, and its solubility was the same as that of Example 1.

Example 5

9 parts of hydroxyethyl cellulose (0.28 hydroxyethyl groups per glucose unit) prepared in the usual manner and wet with 3 parts glacial acetic acid (resulting from drying by solvent exchange from water to acetic acid) were immersed in 300 parts benzene, together with 40 parts chloroacetic acid, and heated with stirring at reflux temperature for 5 hours. 240 parts acetic acid and 0.36 part sulfuric acid (S. G. 1.84) were added with stirring and, after 90 minutes, 80 parts acetic anhydride were added. The mixture was heated and stirred at 40° C. and the fibers dissolved in about 15 minutes. Two hours after the addition of the anhydride, the product was coagulated by adding 2 volumes of ethyl alcohol. The somewhat gelatinous flake was hardened by soaking and then thoroughly washed in hard water. The product contained 2.42 acetyl and 0.24 chloroacetyl groups per anhydroglucose unit, was readily soluble in acetone and other solvents for cellulose esters, and formed clear, tough, heat-stable films.

Example 6

5 parts of air-dried hydroxyethyl cellulose (0.74 hydroxyethyl groups per glucose unit) were added with stirring to a molten mixture of 60 parts chloroacetic acid, 20 parts chloroacetic anhydride, and 0.5 part magnesium perchlorate at 60° C. After 2 hours, 20 parts acetic anhydride were added, and stirring and heating continued for 2.5 hours. The product was coagulated in a large volume of ethyl alcohol, and washed with ethyl alcohol and water until free of acid. The granular, white ester contained 1.43 chloroacetyl and 1.40 acetyl groups per glucose unit, and was quite soluble in acetone as well as chloroform-alcohol mixtures and other common cellulose ester solvents.

Example 7

12.5 parts (on dry basis) of hydroxyethyl cellulose (0.30 hydroxyethyl groups per glucose unit) prepared in the usual manner was dried by solvent exchange from water to acetic acid to benzene, and then heated and stirred in 250 parts benzene with 50 parts chloroacetic anhydride at reflux temperature for 5 hours. The fiber was removed by decantation and rinsed once with benzene and once with heptane (free from olefinic hydrocarbons). The fiber was then acetylated in a mixture of 300 parts n-heptane, 75 parts acetic anhydride, 150 parts acetic acid, and 0.50 part sulfuric acid (S. G. 1.84). The mixture was stirred 30 minutes at room temperature and for 2 hours at 78° C. The ester was obtained as a spongy mass which was filtered off, washed with heptane and alcohol, and dried. It contained 0.45 chloroacetyl groups and 2.20 acetyl groups per glucose unit and had the same properties as the products of Examples 1 and 2.

Example 8

1 part of hydrolyzed hydroxyethyl cellulose acetate flake was suspended (in benzene) or dissolved (in acetone) in about 10 parts of dry solvent and the chloroacetylating agent was added with stirring as a solution of 1 part chloroacetic anhydride in 2 parts solvent. The reaction mixture was stirred and heated at the reflux temperature of the solvent for the time indicated in the table hereafter set forth.

The product was recovered from heterogeneous reactions, as in benzene, by decanting the liquor from the gummy mass of flake, rinsing the flake once, and then, after dissolving the flake in acetone to make a 10% solution, precipitating the product in a large volume of rapidly stirred water.

The product was recovered from homogeneous solution by simply precipitating the product in rapidly stirred water and washing thoroughly.

constitutes an intermediate in the process. Thus, by increasing or decreasing the amount of ethylene oxide reacted with alkali cellulose, a higher or lower hydroxyethyl content respectively will be obtained. The chloroacetyl content is increased by using higher hydroxyethyl contents, improving the activity of the hydroxyethyl cellulose by solvent exchange without drying by heat, and by varying the time of chloroacetylation. Acetyl substitution is preferably varied by hydrolysis procedure, as shown in Example 2. It is to be noted that during the hydrolysis some chloroacetyl groups are lost. Acetyl groups are progressively lost with increasing time of hydrolysis, temperature and catalyst. However, the loss in chloroacetyl content can be offset by starting at a higher substitution. Acetyl content can also be adjusted by hydrolysis of the acetate ester before chloroacetylation. The latter procedure (Example 8) is the simplest way to obtain low chloroacetyl substitutions and is not too dependent on hydroxyethyl content.

The hydroxyethyl cellulose acetate chloroacetate of this invention can have a hydroxyethyl content of from about 0.05 to about 1.70, and preferably up to 0.35 groups per glucose unit, and total ester content of from about 2.0 to about 3.0 groups per anhydrous glucose unit. Hereafter are set forth several specific hydroxyethyl cellulose acetate chloroacetates which have been prepared:

Table

| Hydroxyethyl Cellulose Acetate (Substituents per glucose unit) | | Wt. Ratio of Reagent to Cellulose Derivative | | Solvent[1] | Time | Cl. | Chloroacetyl Groups per glucose unit |
|---|---|---|---|---|---|---|---|
| Acetyl | Hydroxyethyl | Chloroacetic anhydride | Chloroacetic acid | | | | |
| | | | | | Hours | Per cent | |
| 2.34 | 0.13 | | 5 | Benzene | 24 | 1.57 | 0.12 |
| 2.60 | 0.09 | 1 | | Methyl-ethyl-ketone | 24 | 2.30 | 0.19 |
| 2.34 | 0.13 | 1 | | Benzene | 6 | | 0.27 |
| 2.57 | 0.13 | 1 | | do | 20 | | 0.30 |
| 2.57 | 0.13 | 1 | | do | 22 | | 0.25 |
| 2.65 | 0.14 | 1 | | do | 24 | 3.69 | 0.32 |
| 2.69 | 0.28 | 1 | | do | 21 | 2.63 | 0.23 |
| 2.60 | 0.09 | 1 | | Acetone | 48 | | 0.10 |
| 2.60 | 0.09 | 1 | | Methyl-ethyl-ketone | 2.75 | 1.60 | 0.13 |
| 2.60 | 0.09 | 1 | | do | 5.75 | 1.96 | 0.17 |
| 2.60 | 0.09 | 1 | | do | 24 | 2.30 | 0.19 |

[1] Reaction carried out at reflux temperature of solution.

In Examples 1–4, the acetylation was performed directly on swollen, benzene-damp hydroxyethyl cellulose chloroacetates which can be prepared by the process disclosed in application Serial No. 696,621, and, as shown by such examples, no further activation is necessary. Dry hydroxyethyl cellulose chloroacetate can also be used, and, when used, it is either wetted out with water and exchanged to dry acetic acid or pre-soaked in acetic acid and dried with a small amount of anhydride and catalyst.

As disclosed in Examples 5–7 the acetylation of chloroacetylation mixtures can be carried out on the heterogeneous mixtures in benzene or on homogeneous solutions in chloroacetic anhydride and acid. The chloroacetylation mixtures can be those disclosed in application Serial No. 699,621.

The desired hydroxyethyl content of the product can be obtained by reacting an appropriate amount of ethylene oxide with alkali cellulose to produce hydroxyethyl cellulose which

Substituents per glucose unit

| Hydroxyethyl | Acetyl | Chloroacetyl | Total ester |
|---|---|---|---|
| 0.09 | 2.60 | .19 | 2.77 |
| 0.13 | 2.56 | .28 | 2.84 |
| 0.14 | 2.65 | .32 | 2.97 |
| 0.30 | 2.66 | .16 | 2.82 |
| 0.30 | 2.49 | .47 | 2.96 |
| 0.33 | 1.64 | .48 | 2.12 |
| 0.64 | 1.98 | .75 | 2.73 |
| 0.64 | 2.24 | .75 | 2.99 |
| 0.73 | 0.80 | 1.63 | 2.43 |
| 0.75 | 1.88 | 1.04 | 2.92 |
| 0.70 | 1.32 | 1.48 | 2.80 |
| 0.70 | 1.39 | 1.08 | 2.47 |
| 0.70 | 1.30 | 1.12 | 2.42 |

Since it is obvious that many changes and modifications can be made in the above-described details without departing from the nature and spirit of the invention, it is to be understood that the invention is not to be limited thereto except as set forth in the appended claims.

I claim:
1. Hydroxyethyl cellulose acetate chloroacetate.
2. Hydroxyethyl cellulose acetate chloroacetate having an hydroxyethyl content of from about 0.05 to 1.70 groups per glucose unit and a total ester content of from about 2.0 to 3.0 groups per glucose unit.
3. Hydroxyethyl cellulose acetate chloroacetate having an hydroxyethyl content of from about 0.05 to 0.35 groups per glucose unit and a total ester content of from about 2.0 to 3.0 groups per glucose unit.
4. Hydroxyethyl cellulose acetate chloroacetate having about 0.60 chloroacetyl groups per glucose unit, about 0.33 hydroxyethyl groups per glucose unit and a total ester content of from about 2.0 to 3.0 groups per glucose unit.

PAUL W. MORGAN.

REFERENCES CITED

The following references are of record in the file of this patent:

UNITED STATES PATENTS

| Number | Name | Date |
|---|---|---|
| 1,969,468 | Malm et al. | Aug. 7, 1934 |
| 1,994,038 | Hagerdorn et al. | Mar. 12, 1935 |
| 2,100,369 | Whitehead | Nov. 30, 1937 |
| 2,327,397 | Broderick | Aug. 24, 1943 |

FOREIGN PATENTS

| Number | Country | Date |
|---|---|---|
| 318,908 | Great Britain | Sept. 12, 1929 |
| 358,510 | Great Britain | Oct. 8, 1932 |
| 368,271 | Great Britain | Feb. 29, 1932 |
| 372,122 | Great Britain | May 5, 1932 |